(No Model.)
V. SALVESEN.
Ditching Plow.
No. 242,159. Patented May 31, 1881.
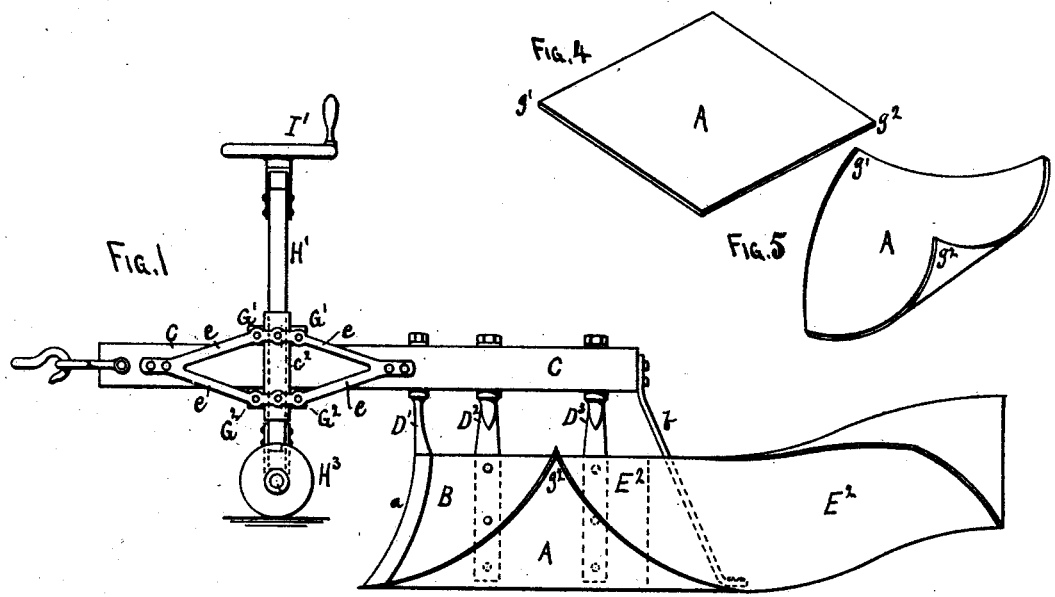
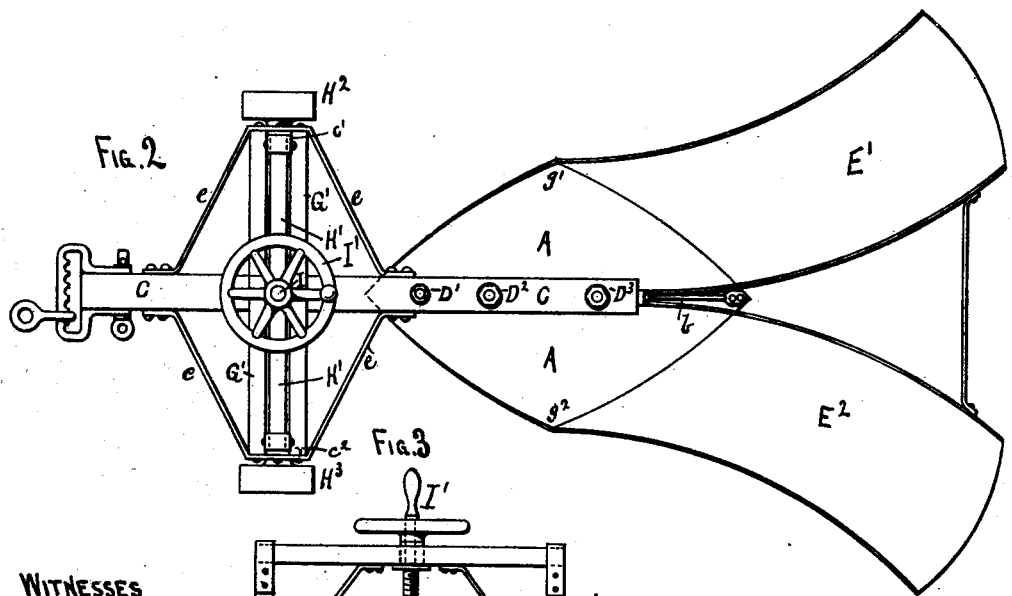
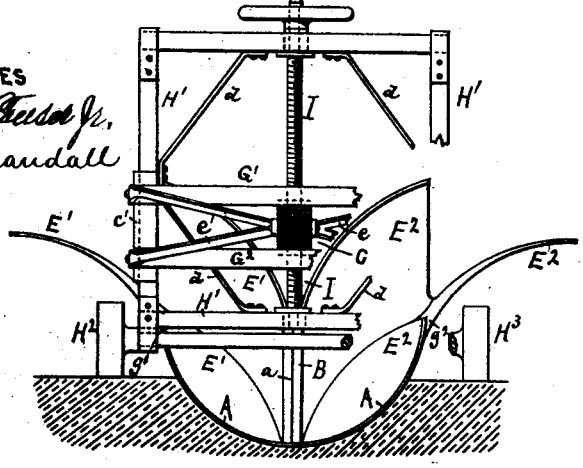

UNITED STATES PATENT OFFICE.

VETLE SALVESEN, OF MOLAND, MINNESOTA.

DITCHING-PLOW.

SPECIFICATION forming part of Letters Patent No. 242,159, dated May 31, 1881.

Application filed March 28, 1881. (No model.)

*To all whom it may concern:*

Be it known that I, VETLE SALVESEN, a citizen of the United States, residing at Moland, in the county of Clay and State of Minnesota, have invented certain new and useful Improvements in Ditching-Plows, of which the following is a specification.

This invention relates to plows, &c., for forming ditches; and it consists in a semicircular share or cutter, connected by its center to an upright plate having a sharp front edge or colter for dividing the earth into two streams, and connecting said center-plate by standards to a plow-beam, and having curved mold-boards or wings attached to the rear ends of said cutter, whereby the earth, when cut by the curved share, may be carried backward and upward and off to either side and deposited upon the banks of the ditch, as hereinafter set forth.

The invention further consists in a frame mounted upon wheels and adapted to be elevated and depressed by a screw running through the forward end of the beam, to regulate the depth of the cut, as hereinafter set forth. I attain these objects by the use of the mechanism illustrated in the accompanying drawings, in which—

Figure 1 is a side elevation, Fig. 2 is a plan view, and Fig. 3 is a front elevation, of the ditcher ready for use. Fig. 4 is a perspective view of the square plate from which the share or cutter is formed before it is bent up into shape; and Fig. 5 is a perspective view of the same after being bent up into shape.

The share or cutter for forming the bottom and sides of the ditch consists of a square or diamond-shaped plate, A, of steel, as shown in Fig. 4, with two of its diagonally-opposite corners bent up in a curve, as shown in Fig. 5, and having an upright plate, B, with a sharp front edge, $a$, attached to its center, and the whole connected to a beam, C, by standards $D'$ $D^2$ $D^3$, while the rear point of the share is connected to the same beam by a brace, $b$. To the rear of the plate B and cutter A wings $E'$ $E^2$ are bolted and curve backward and upward and off to either side, so that they form gradually-curved mold-boards, up which the earth runs as it is cut by the share A, and is deposited upon the banks upon either side as the ditch is formed. By this simple arrangement a plow is formed which, when drawn through the ground, will cut a semicircular ditch and deposit the earth in ridges or furrows upon either bank.

Across the beam C, forward of the share A, a frame, $G'$ $G^2$, is bolted, and provided at either end with upright guides $c'$ $c^2$, in which a frame, $H'$, is adapted to be run up and down by a screw, I, journaled in said frame $H'$, and passing through a nut in the beam C, and having a hand wheel or crank, $I'$, by which it may be revolved. To the bottom side of the frame $H'$ wheels $H^2$ $H^3$ are journaled and adapted to run upon the ground ahead of the cutter. By this arrangement of the frames $G'$ $G^2$ and $H'$, and wheels $H^2$ $H^3$ and screw I, an adjustable support is formed for the front of the beam, which may be thus elevated or depressed to regulate the depth of cut of the ditcher.

The frame $H'$ will be strengthened by braces $d$, while similar braces $e$ will assist in supporting the frame $G'$ $G^2$ upon the beam C. The beam C and frame $H'$ will also be strengthened by metal plates upon their tops and bottoms.

I claim many advantages by this arrangement, the principal feature being its extreme simplicity and ease of working, as the manner of forming and arranging the cutter A and mold-boards $E'$ $E^2$, being in such a gradual curve, enables the plow to be drawn through the ground with the expenditure of much less power than ordinary ditchers. It also forms a ditch and removes the earth from it in two separate furrows, so that the strain is equal on both sides; hence no side strains occur. It is also very cheaply and easily built, and by being formed so that all the parts are firmly bolted or riveted to each other, and with no loose joints, it is not liable to become disarranged or broken.

The share or cutter A may be bent in any other shape than semicircular, if desired.

The upper corners, $g'$ $g^2$, of the cutter A may be connected to the beam C by braces or tie-rods to prevent spreading.

What I claim as new is—

1. In a ditching-machine, the cutter or share A, formed of one piece of square, oblong, or diamond-shaped plate of sheet metal, bent up by two of its diagonally-opposite corners into a semicircular or other suitable shape to conform to the ditch it is designed to cut, in combination with the sharp-edged central plate, B, and beam C, substantially as set forth.

2. The combination and arrangement of the semicircular share A, central plate, B, and wings $E'$ $E^2$, substantially as set forth.

3. The frame $G'$ $G^2$, provided with guides $c'$ $c^2$, in combination with frame $H'$, adapted to run up and down in guides $c'$ $c^2$, screw I, beam C, and cutter A, substantially as set forth.

In testimony whereof I have hereunto set my hand in the presence of two subscribing witnesses.

VETLE SALVESEN.

Witnesses:
  HALVORA SALVESEN,
  J. W. RODGERS.